United States Patent [19]

Sugawara et al.

[11] Patent Number: 5,731,938
[45] Date of Patent: Mar. 24, 1998

[54] MAGNETIC HEAD DEVICE HAVING INCREASED DIMENSIONAL ACCURACY AND IMPROVED MAGNETIC CHARACTERISTICS

[75] Inventors: Naoto Sugawara; Seiichi Watanabe; Seiichi Handa, all of Chiyoda-ku, Japan

[73] Assignee: Mitsubishi Denki Kabushiki Kaisha, Tokyo, Japan

[21] Appl. No.: 619,020

[22] Filed: Mar. 20, 1996

[30] Foreign Application Priority Data

Jul. 19, 1995 [JP] Japan ................................. 7-182507

[51] Int. Cl.⁶ ............................................. G11B 5/127
[52] U.S. Cl. ................................. 360/121; 360/125
[58] Field of Search ............................. 360/121, 122, 360/125

[56] References Cited

U.S. PATENT DOCUMENTS

| | | | |
|---|---|---|---|
| 4,748,527 | 5/1988 | Fujioka et al. | 360/121 X |
| 4,750,071 | 6/1988 | Kato et al. | 360/121 |
| 5,276,578 | 1/1994 | Kato et al. | 360/121 X |
| 5,479,309 | 12/1995 | Kato et al. | 360/121 |
| 5,497,283 | 3/1996 | Kato | 360/123 |

FOREIGN PATENT DOCUMENTS

| | | |
|---|---|---|
| 60-93608 | 5/1985 | Japan. |
| 61-107509 | 5/1986 | Japan. |
| 1-91309 | 4/1989 | Japan. |
| 4-302806 | 10/1992 | Japan. |
| 1 001 376 | 8/1965 | United Kingdom. |
| 2242774 | 10/1991 | United Kingdom. |
| 90/102963/14 | 6/1990 | WIPO. |

*Primary Examiner*—John H. Wolff
*Attorney, Agent, or Firm*—Wolf, Greenfield & Sacks, P.C.

[57] ABSTRACT

A magnetic head device comprising:
  a magnetic circuit which includes a head core unit, a back core and a coil;
  the head core unit including a first core made from a magnetic material and a second core made from a magnetic material, and forming a magnetic gap between the first core and the second core;
  the back core made from a magnetic material and jointed to the first core and the second core so as to form back gaps;
  the coil arranged on the first core;
  a first holder which is bonded to the first core and the second core at two locations of the side of the magnetic gap and the side of the back gaps so as to hold the magnetic circuit; and
  a second holder which is bonded to the first core and the second core at the magnetic gap side so as to hold the magnetic circuit, and which is substantially of a square pillar.

17 Claims, 11 Drawing Sheets

FIGURE 16

MAGNETIC HEAD DEVICE HAVING INCREASED DIMENSIONAL ACCURACY AND IMPROVED MAGNETIC CHARACTERISTICS

FIELD OF THE INVENTION

The present invention is related to a magnetic head device which is mounted on a flexible magnetic disc drive and the like.

DISCUSSION OF THE RELATED ART

Figure 11:
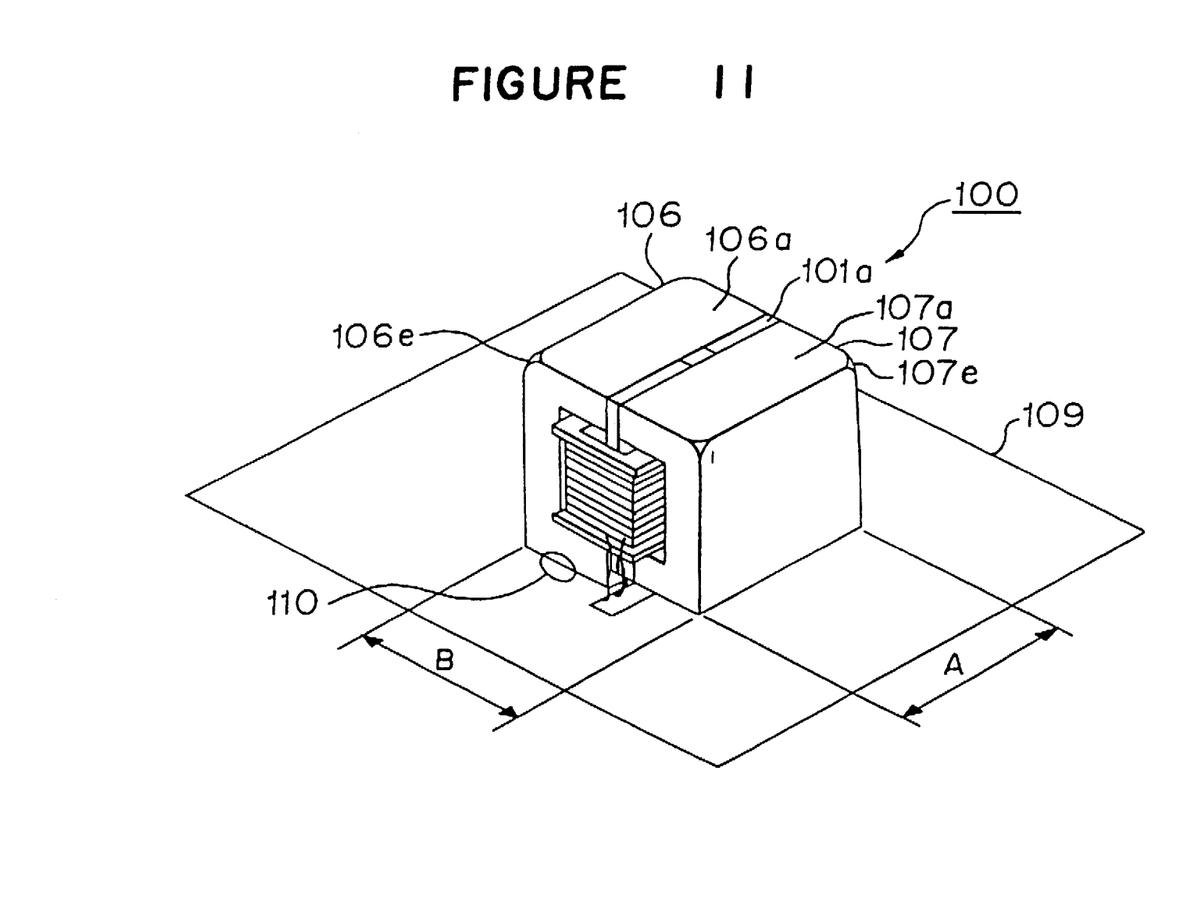
FIG. 11 is a perspective view showing a conventional magnetic head device.
Figure 12:
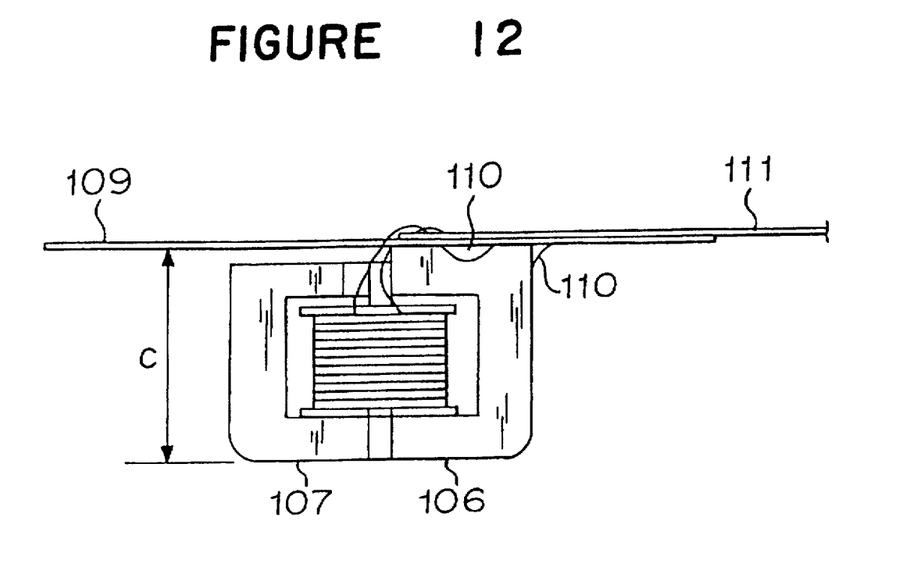
FIG. 12 is a side view showing the conventional magnetic head device.
Figure 13:
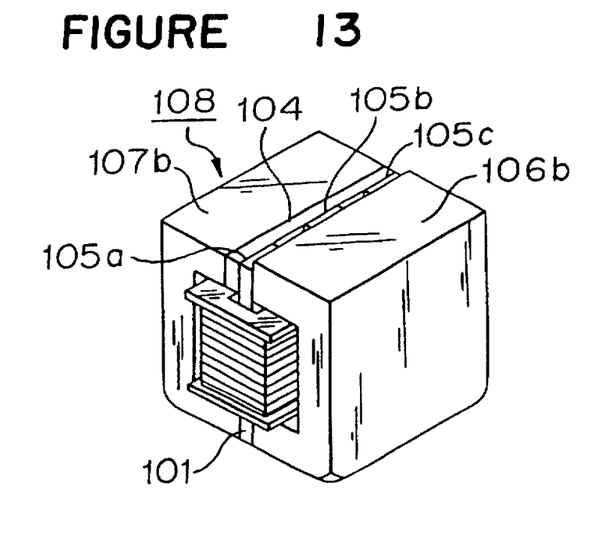
FIG. 13 is a perspective view showing the slider in the conventional magnetic head device.
Figure 14:
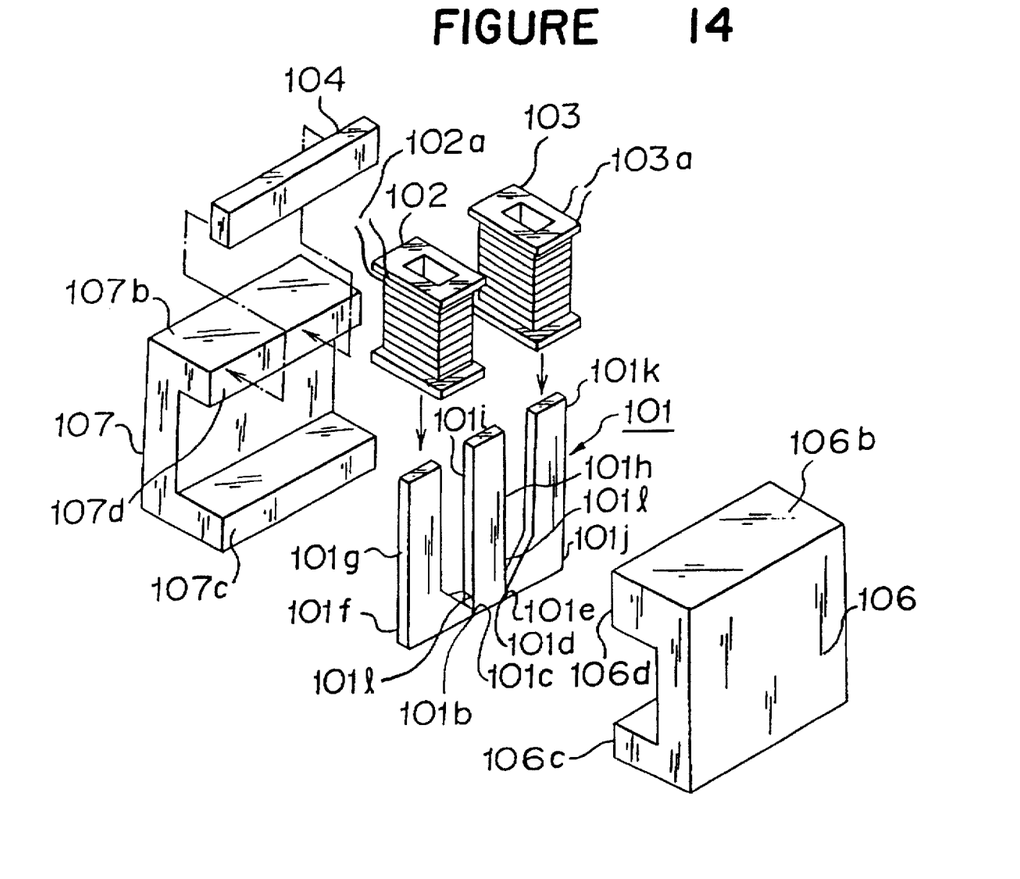
FIG. 14 is a perspective exploded view showing the slider in the conventional magnetic head device.
Figure 15:
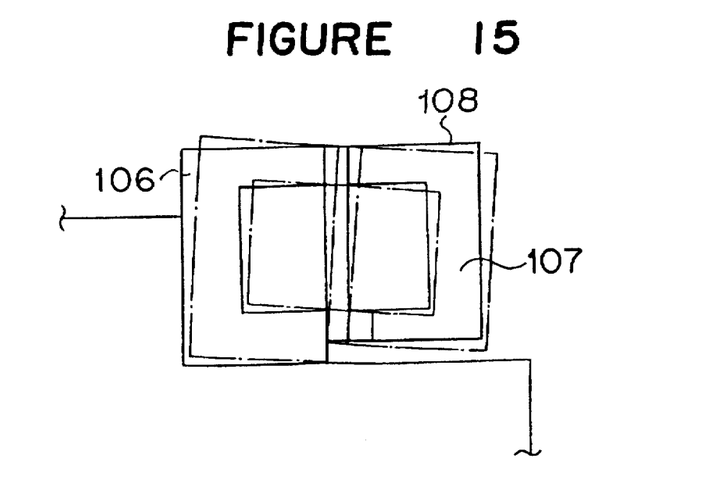
FIG. 15 is a schematic view showing how to affix the conventional slider to a jig in grinding and polishing processes for a sliding surface.
Figure 16:
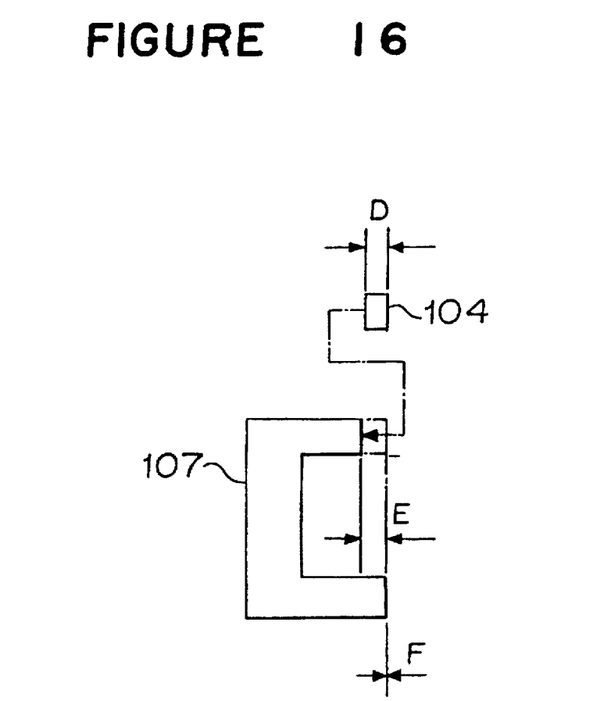
FIG. 16 is a schematic view showing the relationship between the holder and the back core in the conventional magnetic head device.

In FIGS. 11–16, there is shown a conventional magnetic head device. FIG. 11 is a perceptive view of the conventional magnetic head device (an FPC, Flexible Printed Circuit, is not shown). FIG. 12 is a side view of the magnetic head device. FIG. 13 is a partial perceptive of the magnetic head device as viewed from a spring member mounting side. FIG. 14 is a perceptive exploded view of the magnetic head device as viewed from the same side. FIG. 15 is a partial diagrammatic view showing how to mount the magnetic head device on a jig in grinding and polishing processes, wherein coils are omitted for clarification. FIG. 16 is a schematic view showing a dimensional relationship of a holder and a back core when they are bonded together.

In FIGS. 11 and 12, reference numeral 100 designates the magnetic head device which is mounted on a flexible magnetic disc drive and the like to carry out recoding, reproducing or erasing. References A, B and C designate the sizes in a longitudinal direction, a width direction and a height direction of a slider, which are 3.8 mm, 2.9 mm and 2.1–2.7 mm, respectively.

In FIGS. 11–14, the reference numeral 100 designates the magnetic head device which has been proposed in the past. Reference numeral 101 designates a core head unit for electromagnetic conversion in the magnetic head device 100. Reference numeral 101a designates a sliding portion of the head core unit 101, which slides with respect to a recording medium (not shown). Reference numeral 101b designates a recording/reproducing gap. Reference numeral 101c designates a recording/reproducing gap depth. Reference numeral 101d designates an erasing gap. Reference numeral 101e designates an erasing gap depth. Those gap depths require strict dimensional accuracy. In particular, the recording/reproducing gap depth 101c requires a tolerance of several μms. Miniaturizing the device and having a large-capacity in memory require a stricter tolerance.

Reference numeral 101f designates a recording/reproducing core which is inserted into a recording/reproducing coil, and which is made from a magnetic material. Reference numeral 101g designates a leg of the recording/reproducing core 101f, and reference numeral 101h designates a center core which forms the recoding/reproducing gap 101b together with the recording/reproducing core 101f, and which is also made from a magnetic material. Reference numeral 101i designates a leg of the center core 101h. With respect to the center core 101h and the leg 101i, the size in the longitudinal direction is about 0.35 mm for a recoding medium with a memory capacity of 2 M, and about 0.2 mm for a recording medium with a memory capacity of 4 M. The larger and the denser the memory capacity of a recording medium is, the size tends to get smaller.

Reference numeral 101j designates an erasing core which is inserted into an erasing coil, which forms the erasing gap 101d together with the center core 101h, and which is also made from a magnetic material. Reference numeral 101k designates a leg of the erasing core 101j.

The legs 101g, 101i and 101k are as thin as 0.3 mm in the size in the width direction (thickness), and are remarkably liable to be damaged (broken) by application of a slight external force. In particular, the larger and the denser the memory capacity of a recording medium is, the leg 101i tends to get smaller, and is more liable to be damaged.

Reference numeral 101l designates glass members which bond the recording/reproducing core 101f and the center core 101h together and the center core 101h and the erasing core 101j together, respectively.

Reference numeral 102 designates the recording/reproducing coil which the leg 101f forming a recording/reproducing magnetic path is inserted into, and which carries out electromagnetic conversion. Reference numeral 102a designates coil terminals. Reference numeral 103 designates the erasing coil which the leg 101k forming an erasing magnetic path is inserted into, and which carries out electromagnetic conversion. Reference numeral 103a designates coil terminals.

Those coil terminals 102a and 103a are connected to wiring (FPC) by e.g. soldering.

Reference numeral 104 designates a back core which is jointed to the legs 101g, 101i and 101k at the open end sides thereof and is fixed thereto by an adhesive to close the recording/reproducing magnetic path and the erasing magnetic path, and which is made from a magnetic material.

Reference numeral 105a–105c designate back gaps which form minute gaps (a surface roughness of several μms) at the jointed portions between the back core 104 and the legs 101g, 101i and 101k respectively. The presence of variations in the sizes of the back gaps has a significant adverse effect on magnetic characteristics.

Reference numerals 106 and 107 designate holders which are made from a ceramics, which hold the head core unit 101 in such a manner to sandwich the head core unit 101 there between, and which is substantially in a U-character shape. Reference numeral 106a designates a sliding surface which slides with reference to a recording medium (not shown). Reference numeral 106b designates a bottom surface which is in surface contact with a leaf spring member, and which has a size of 1.3 mm in the width direction. Reference numerals 106c and 106d designate core joint surfaces which are not clearly shown in FIG. 14, which are jointed and bonded to the core head unit 101 at a gap side and at an open end side, and which are formed to be flush with each other. Reference numeral 106e designates a radius chamfered corner which is machined so as to prevent e.g. damage from being given to the recording medium (not shown) and enable the gap portion to be sliding contact with the recording medium in an appropriate manner.

Reference numeral 107a designates a sliding surface which slides with reference to the recording medium (not shown) like the sliding surface 106a. Reference numeral 107b designates a bottom surface which has a size of 1.3 mm in the width direction. Reference numeral 107c designates a core joint surface which is jointed and bonded to the core head unit 101 at the gap side. Reference numeral 107d designates a back core joint surface which is jointed and bonded to the back core 104. Reference numeral 107e designates a radius chamfered corner like the radius chamfered corner 106e.

As shown in FIG. 16, between the core joint surface 107c and the back core joint surface 107d is a difference that the back core joint surface is set back by the thickness (in the width direction) of the back core. Reference D designates the thickness of the back core 104, reference E designates the difference, and reference F designates a difference which is created between the core joint surface 107c and a joint surface of the back core 104 to the head core unit 101 after joint of the back core.

The head core unit 101, the recording/reproducing coil 102, the erasing coil 103, the back core 104, the holder 106 and the holder 107 which have been described in detail are assembled to constitute a so-called slider 108.

Reference numeral 109 designates the spring member which holds the slider 108, which is in surface contact with the bottom surface 106b of the holder 106, and which is fixedly bonded to the holder 106 by an epoxy adhesive 110 at two side edges and at one back edge except for the edge facing to the holder 107 though only one of the side edges is shown in FIG. 11.

Reference numeral 111 designates the FPC as wiring, to one end side of which the coil terminals 102a and the coil terminals 103a are connected by e.g. soldering. The FPC has the other end side connected to a device with the magnetic head device 100 mounted thereon to interchange electric signals.

Now, a method for preparing the magnetic head device will be explained briefly.

In advance, the recording/reproducing core 101f, the center core 101h and the erasing core 101j are bonded together by the glass member 101l to form the core head unit 101, and the core head unit is machined to have a predetermined thickness.

The back core 104 which has been machined to have a predetermined thickness and predetermined surface accuracy is bonded to the back core joint surface 107d of the holder 107. Since the core joint surface 107c, and the surface of the back core 104 which joints to the legs 101g, 101i and 101k are not flush with each other and, therefore, have a slight difference, grinding and polishing is carried out to align the joint surfaces in order to obtain the back gaps 105a, 105b and 105c having a desired size.

The leg 101g of the recording/reproducing core 101f, and the leg 101k of the erasing core 101j are inserted into the recording/reproducing coil 102 and the erasing coil 103, respectively. Then, the holder 106, and the holder 107 with the back core 104 bonded thereto are fixedly bonded to the head core unit 101 in such a manner to sandwich the head core unit 101 therebetween.

The slider thus assembled is affixed to a jig as shown in FIG. 15 (see the portion detected in solid lines). Wax is used as an adhesive. The wax is heated to be almost liquefied, the liquefied wax is applied to a portion of the jig. The bottom surface 106b of the holder 106 is bonded to and pressed against that portion. After that, the wax is solidified by cooling to bond the slider 108 to the jig.

As clearly shown in FIG. 15, there is a difference between the sizes of the holder 106 and the holder 107 in the height direction. Specifically, both holders are different in terms of the sizes at the bottom side, and it seems as if the holder 7 is floating. In order to cope with irregularity in surface, which is created by bonding a plurality of sliders, such a difference is provided to obtain a reference surface for machining and mounting.

The presence of the difference leads to risks of the slider being affixed to the jig on a tilt, or an external force due to some influence such as handling during an affixing operation being applied to bond the slider to the jig on a tilt as shown in FIG. 15 (see a portion detected in chain lines). As a result, the operation for affixing the slider 108 to the jig requires considerable practice, and is extremely difficult work.

A solution for avoiding such problems is that no difference in the height direction is provided, and that the bottom surface of the slider is ground and polished in advance to obtain the reference surface. However, such a solution increases the number of production processes.

After the slider 108 is bonded to the jig, the slider has a sliding surface side ground and polished to obtain a required gap depth and required surface accuracy. Polishing is carried out by a lapping machine in wet lapping using fine abrasive grains.

After completing desired machining, the slider 108 is taken off the jig, and the slider is washed by an organic solvent to remove the wax.

After washing, the slider 108 is mounted to another jig. In order to form radius chamfered corners on the sliding surface of the slider, radius chamfering is carried out by polishing the sliding surface side of the slider while swinging and rolling the jig.

After that, the slider 108 is taken off the jig, and is washed.

Next, the slider is fixedly bonded to the spring member 109 as shown in FIG. 12, and the coil terminals 102a and the coil terminals 103a are connected to the wiring 111 by e.g. soldering.

Now, the operation of the magnetic head device will be explained. When electrical signals indicative of data are transmitted from the flexible magnetic disc drive to the magnetic head device 100 in such a manner that the magnetic head device 100 has the sliding portion 101 in touch with a recording medium (not shown), the electrical signals flow through recording/reproducing coil 102 to generate magnetic fluxes at the recording/reproducing gap 101b by electromagnetic conversion, thereby recording the data on the recording medium. In the case of contact, the recording/reproducing gap 101b slides on the recording medium to generate magnetic fluxes in accordance with the recorded data. The generated magnetic fluxes are converted into electric signals by the recording/reproducing coil 102, and the electric signals are transmitted to the flexible magnetic disc drive.

In the case of erasing, current for erasing data flows in the erasing coil 103 to generate magnetic fluxes at the erasing gap 101d like the case of recording, thereby erasing the data on the recording medium.

The structure of the conventional magnetic head device as explained above creates the following problems.

The presence in the difference between both holders 106 and 107 in the height direction creates a stepwise difference at the bottom side of the slider 108. The area of the bottom surface 106b is lower than half (about 45%) the total area of the slider 108 in the direction parallel to the bottom surface, and the bottom surface occupies an offset position. As a result, in the grinding and polishing processes for the slider 108, the slider could be affixed to the jigs on a tilt, and could be tilted by an external force due to some influence. Machining the slider 108 affixed to the jigs on a tilt prevents desired working accuracy and dimensional accuracy from being obtained, creating problems in that magnetic characteristics are degraded due to lack of the desired dimensional accuracy in the recording reproducing gap depth 101c, and that the recording/reproducing gap 101b and the erasing gap 101d can not slide with reference to the recording medium in an appropriate manner.

If the bottom surface side of the slider is ground and polished to solve those problems, the number of the production processes increases, creating a problem in that the production cost becomes rather expensive.

The arrangement wherein the holder 106 and the holder 107 are bonded to the open end side of the head core unit 101 and the back core 104 so as to sandwich the open end side of the head core unit and the back core requires that there be provided the set back for the back core 104 at the side of the holder 107. As a result, after bonding the back core 104 to the holder 107, grinding and polishing must be done in order to joint and bond the holder and the back core to the head core unit 101, creating the number of the production processes.

A force is applied to the holder 107 on a substantially central portion of the surface of the holder 107 opposite to the holder 106 to press the holder 107 against the holder 106, bonding the holder 107 and the head core unit 101 together. Although the joint surface 107c of the holder 107 and the joint surface of the back core 104 which joint with the head core unit 101 are ground and polished to be flush with each other, formation of a minute adhesive layer on the back core joint surface 107d creates variations between the pressing force against the core joint surface 107c and the pressing force against the legs 101g, 101i and 101k. As a result, it is difficult to obtain the back gaps 105a–105c in a stable manner, creating a problem in that the respective back gaps have different magnetic characteristics to degrade reliability.

In addition, the recording/reproducing coil 102 and the erasing coil 103, in particular the bobbins of the respective coils, project from sides of the holder 106 and the holder 107. There is a possibility that the leg 101g and the leg 101k are damaged due to contact during e.g. handling, contributing to lower yield.

SUMMARY OF THE INVENTION

It is an object of the present invention to solve those problems, and to provide a structure and a production method of a magnetic head device, which are capable of easily obtaining working accuracy and dimensional accuracy at grinding and polishing processes to improve magnetic characteristics, of easily and stably forming equal and minute back gaps having variations minimized to improve reliability and magnetic characteristics, and of improving yield.

The foregoing and other objects of the present invention have been attained by provided a magnetic head device and a method for preparing it, which will be described as follows:

According to a first aspect of the present invention, there is provided a magnetic head device comprising a magnetic circuit which includes a head core unit, a back core and a coil; the head core unit including a first core made from a magnetic material and a second core made from a magnetic material, and forming a magnetic gap between the first core and the second core; the back core made from a magnetic material and jointed to the first core and the second core so as to form back gaps; the coil arranged on the first core; a first holder which is bonded to the first core and the second core at two locations of the side of the magnetic gap and the side of the back gaps so as to hold the magnetic circuit; and a second holder which is bonded to the first core and the second core at the magnetic gap side so as to hold the magnetic circuit, and which is substantially of a square pillar.

According to a second aspect of the present invention, there is provided a magnetic head device comprising a magnetic circuit which includes a head core unit, a recording/reproducing coil, an erasing coil, and a back core; the head core unit including a first core made from a magnetic material, a second core forming a first magnetic gap between the first core and the second core so as to carry out magnetic recoding or reproducing, and a third core made from a magnetic material and forming a second magnetic gap between the second core and the third core so as to carry out magnetic erasing; the recording/reproducing coil arranged on the first core so as to carry out electromagnetic conversion; the erasing coil arranged on the third core so as to carry out electromagnetic conversion; the back core made from a magnetic material and jointed to the first core, the second core and the third core so as to form back gaps; a first holder which is bonded to the first core, the second core and the third core at two locations of the side of the first magnetic gap or the second magnetic gap and the side of the back gaps so as to hold the magnetic circuit; a second holder which is bonded to the first core, the second core and the third core at the first magnetic gap side and the second magnetic gap side so as to hold the magnetic circuit, and which is substantially of square pillar; and a supporting member for holding the first holder.

According to a third aspect of the present invention, the first holder includes a contact surface which has a predetermined area to contact the supporting member, and the magnetic device has an axis of the center of gravity passing through the contact surface. The "axis of center of gravity" means an imaginary axis drawn through the center of gravity of the magnetic head device in a gravitational direction.

According to a fourth aspect of the present invention, the area of the contact surface is larger than 50% of the area of the magnetic head device except for the supporting member, which is projected on a plane of the contact surface from a direction vertical to the contact surface.

According to a fifth aspect of the present invention, the first holder has the recording/reproducing coil and the erasing coil bonded thereto and held thereby.

According to a sixth aspect of the present invention, the second core has the magnetic circuit divided into a path for a recording/reproducing magnetic circuit and a path for an erasing magnetic circuit.

According to a seventh aspect of the present invention, the recording/reproducing coil and the erasing coil have wires coated with a film made from polymido resin, polyamide resin or polyurethane resin.

According to an eighth aspect of the present invention, there is provided a method for preparing a magnetic head device , the magnetic head device including a magnetic circuit which includes a head core unit, a back core and a coil; the head core unit including a first core made from a magnetic material, and a second core forming a magnetic gap between the first core and the second core; the back core made from a magnetic material and jointed to the first core and the second core so as to form back gaps; the coil arranged on the first core; and a holder which has a first joint surface bonded to the magnetic circuit at the side of the magnetic gap of the magnetic circuit to hold the magnetic circuit and has a second joint surface bonded to the magnetic circuit at the side of the back gaps of the magnetic circuit to hold the magnetic circuit; the method comprising jointing the first core and the second core to the second joint surface; and applying a load of not less than 0.25 kg/mm² to the back core toward the second joint surface at substantially central locations of jointed portions where the back core is jointed to the first core and the second core, thereby bonding the back core to the first core and the second core.

According to a ninth aspect of the present invention, there is provided a method for preparing a magnetic head device, the magnetic head device including a magnetic circuit which includes a head core unit, a back core and a coil; the head core unit including a first core made from a magnetic material, and a second core forming a magnetic gap between the first core and the second core; the back core made from a magnetic material and jointed to the first core and the second core so as to form back gaps; the coil having a wire wound thereon and arranged on the first core, the wire coated with a film made from polymido resin, polyamide resin or polyurethane resin; and a holder which bonds the magnetic circuit thereto at two locations of the side of the magnetic gap and the side of back gaps to hold the magnetic circuit; the method comprising bonding the coil to the holder to fix the coil thereto; and holding the holder to polish a sliding surface after formation of the back gaps by jointing the back core to the first core and the second core.

Since the magnetic head device and the method for preparing it in accordance with the present invention are characterized as stated above, the present invention can offer the following advantages.

In the first aspect, the first holder is bonded to the first core and the second core at two locations of the magnetic gap side and the back gap side. As a result, it is possible to prevent the first core and the second core from being damaged. It is also possible to joint the back core to the first core and the second core independently of any holder, facilitating bonding and equalizing the back gaps.

In the second aspect, the first holder is bonded to the first core, the second core and the third core at two locations of the first magnetic gap side or the second magnetic gap side, and the back gap side. As a result, it is possible to prevent the first core, the second core and the third core from being damaged. It is also possible to bond the back core to the first core, the second core and the third core independently of any holder, facilitating bonding and equalizing the back gaps.

In the third aspect, the first holder includes the contact surface which has the predetermined area to contact the supporting member, and the magnetic device has the axis of the center of gravity passing through the contact surface. As a result, it is possible to affix the magnetic head device to a jig in a suitable position on production, and to prevent dimensional accuracy from degrading. It is also possible to stably fix the magnetic head device to the supporting member through the contact surface, enabling correct sliding movement with respect to a recording medium, preventing magnetic characteristics from lowering and improving reliability.

In the fourth aspect, the area of the contact surface is larger than 50% of the area of the magnetic head device which is projected on a plane of the contact surface from the direction vertical to the contact surface. As a result, it is possible to affix the magnetic head device to a jig in a suitable position on production and to prevent dimensional accuracy from degrading. It is also possible to stably fix the magnetic head device to the supporting member through the contact surface, enabling correct sliding movement with respect to a recording medium, preventing magnetic characteristics from lowering and improving reliability.

In the fifth aspect, the first holder has the recording/reproducing coil and the erasing coil bonded thereto and held thereby. As a result, it is possible to prevent the first core, the third core or the second core from being damaged, improving yield.

In the sixth aspect, the second core has the magnetic circuit divided into the recording/reproducing magnetic circuit path and the erasing magnetic circuit path. As a result, it is easy to avoid cross talk, improving magnetic characteristics.

In the seventh aspect, the recording/reproducing coil and the erasing coil have coil wires coated with a film made from a polymido resin, a polyamide resin and polyurethane resin. As a result, it is possible to prevent the coils from being damaged by e.g. an organic solvent.

In the eighth aspect, a load of not less than 0.25 kg/mm$^2$ is applied to the back core toward the second joint surface at substantially central locations of the jointed portions where the back core is jointed to the first core and the second core, thereby bonding the back core to the first core and the second core. As a result, it is possible to easily control the back gaps, and to obtain a highly reliable magnetic head device having stable quality.

In the ninth aspect, the coil is bonded to the holder, and the sliding surface is polished after formation of the back gaps by jointing the back core to the first core core and the second core. As a result, it is possible to prevent the first core or the second core from being damaged by the coils, improving yield and obtaining an economical magnetic head device.

BRIEF DESCRIPTION OF THE DRAWINGS

The invention will now be described by way of example and with reference to the accompanying drawings in which.

DETAILED DESCRIPTION

Figure 1:
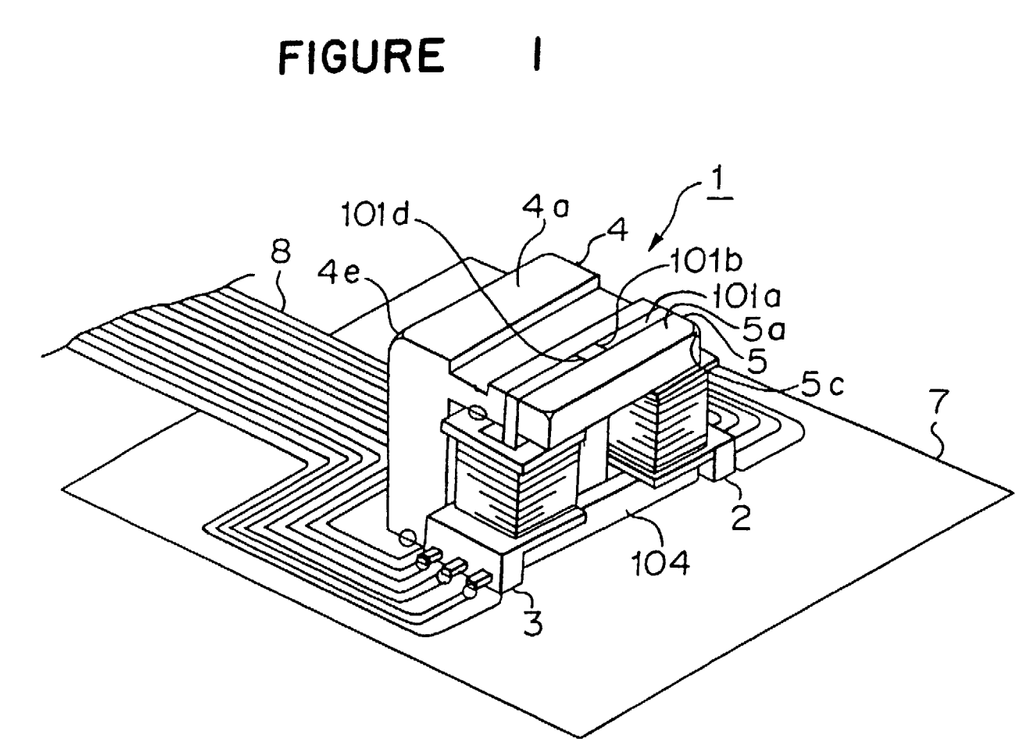
FIG. 1 is a perspective view of an embodiment of the magnetic head device according to the present invention.
Figure 2:
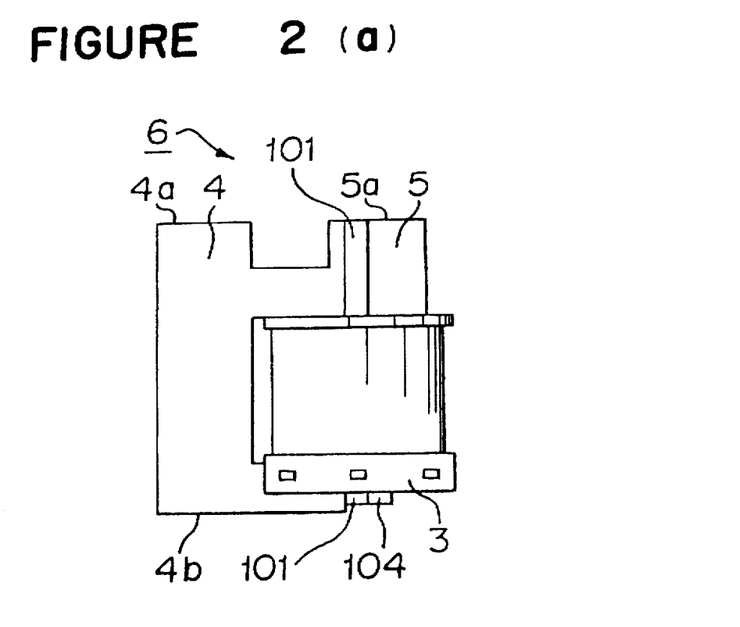
FIGS. 2(a) and 2(b) are a front view and a side view of a slider of the embodiment.
Figure 3:
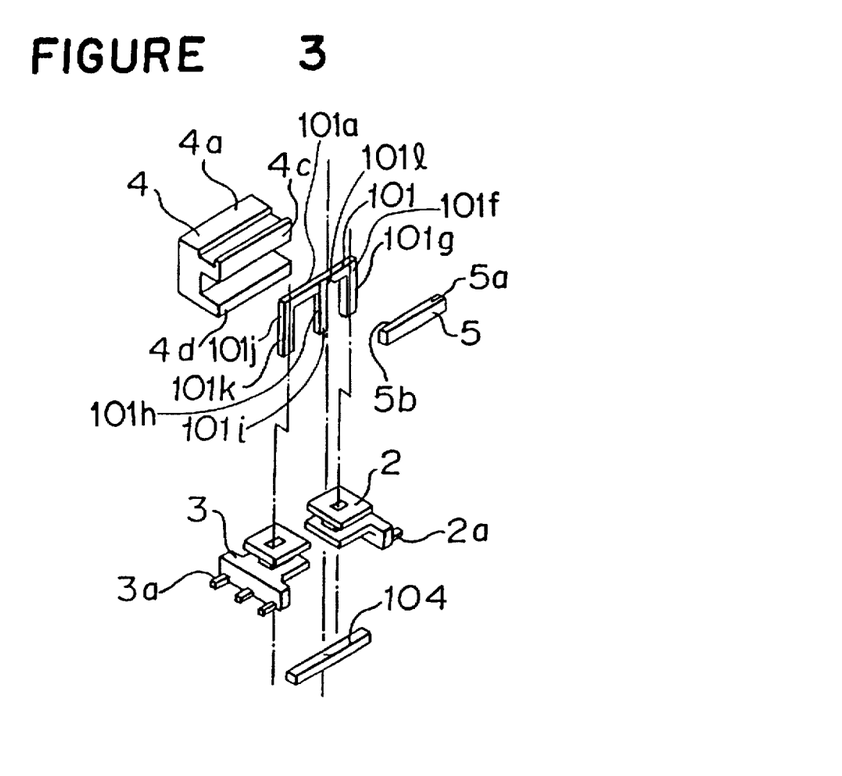
FIG. 3 is a perspective exploded view of the slider.
Figure 4:
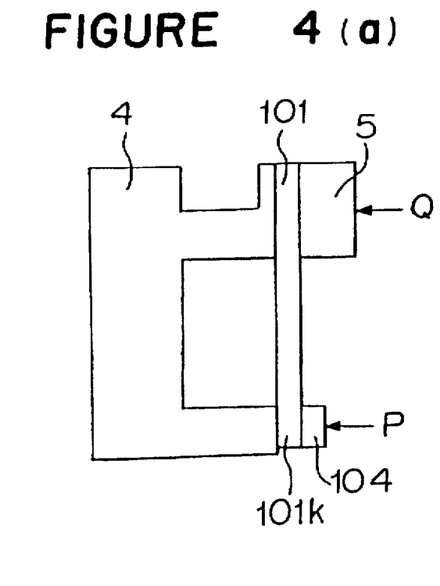
FIGS. 4(a) and 4(b) are schematic views showing how to assemble holders and a back core.
Figure 5:
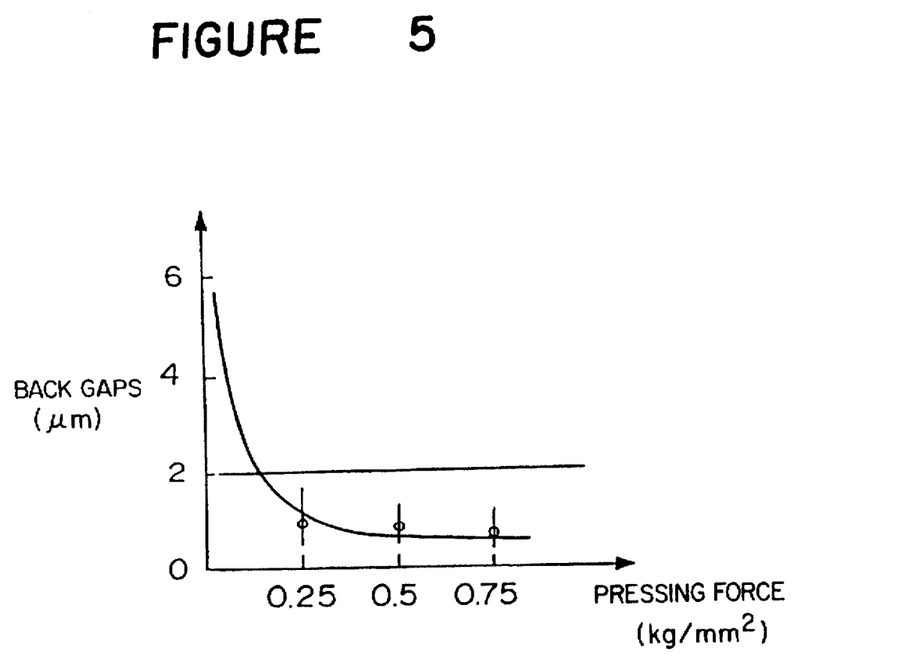
FIG. 5 is a graph of the characteristic curve showing the relationship between pressing forces and back gaps.
Figure 6:
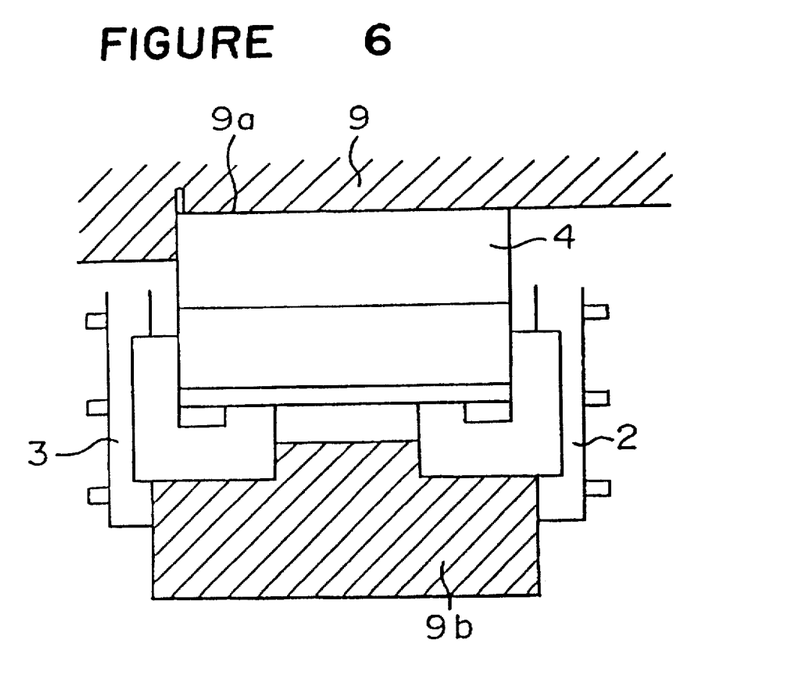
FIG. 6 is a schematic view showing an assembly process in a plan view.
Figure 7:
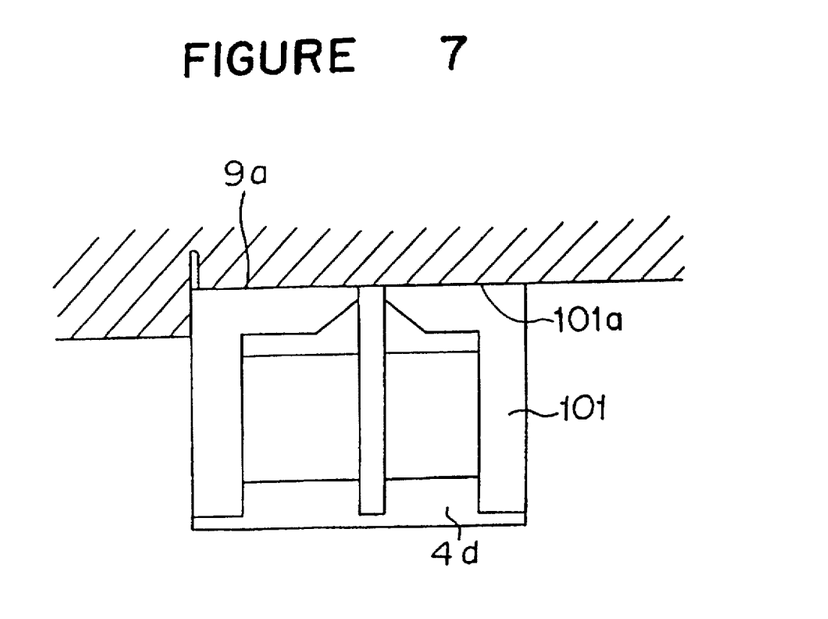
FIG. 7 is a schematic view showing an assembly process in a front view.
Figure 8:
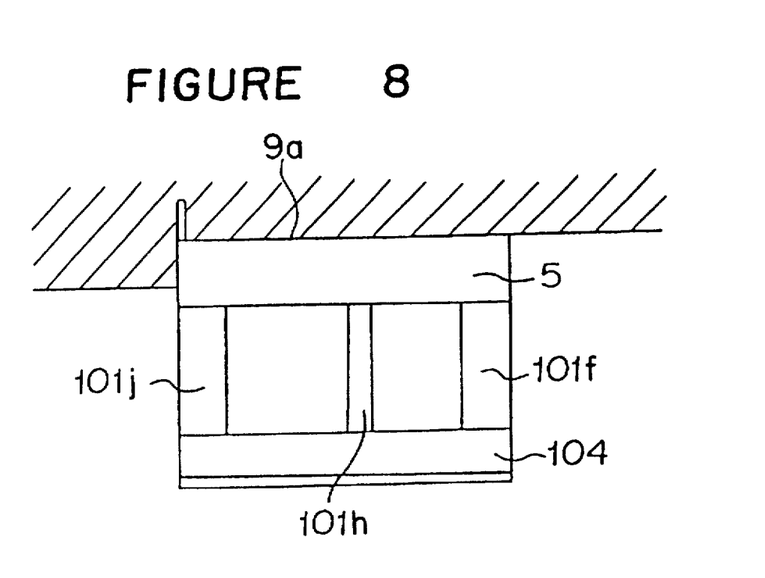
FIG. 8 is a schematic view showing an assembly process in front view.
Figure 9:
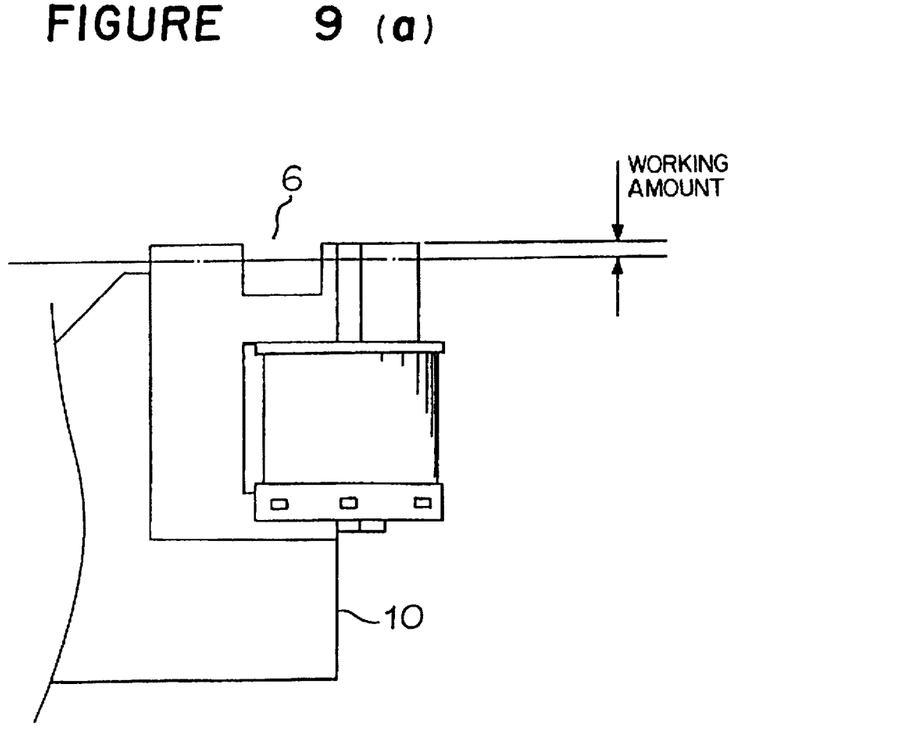
FIGS. 9(a) and 9(b) are schematic views showing how to affix a slider to a jig in grinding and polishing processes for a sliding surface.
Figure 10:
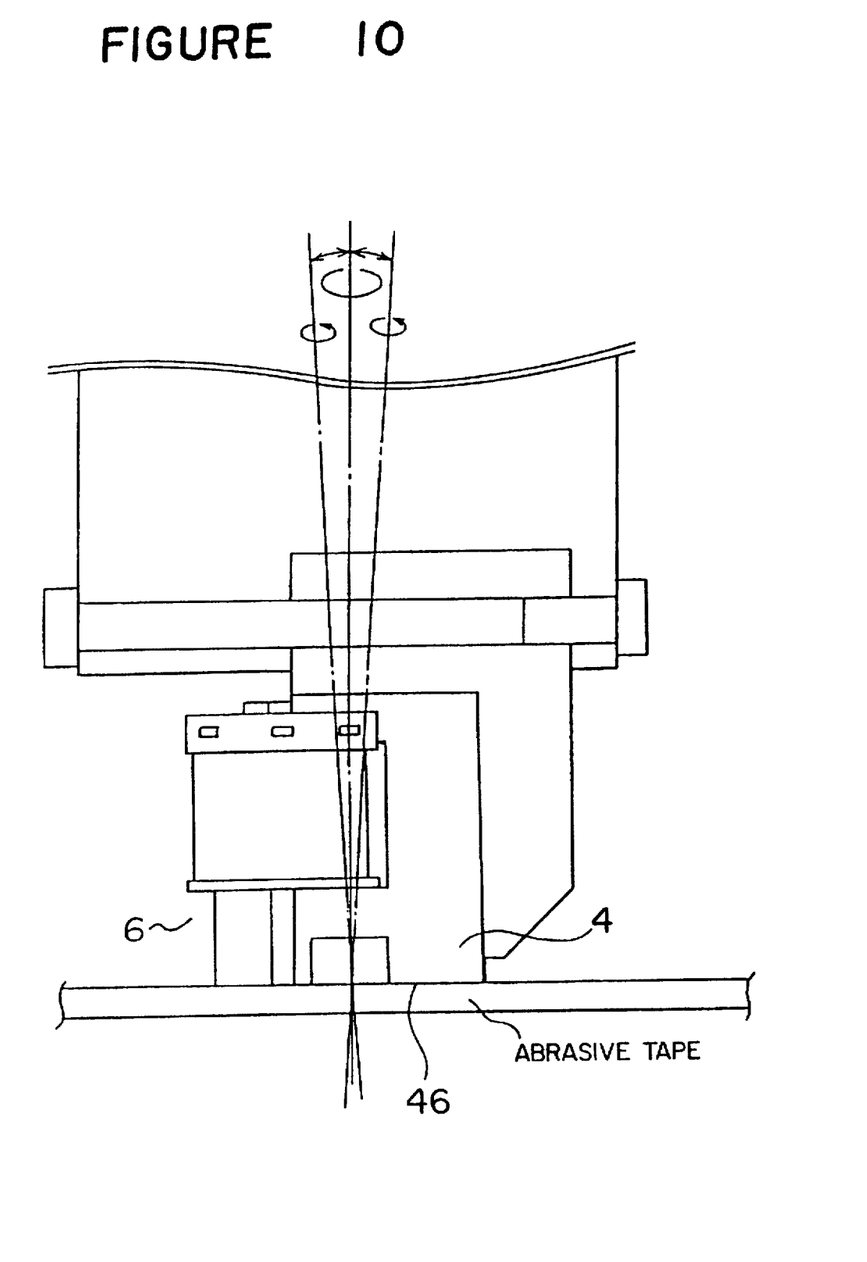
FIG.10 is a schematic view showing how to affix the slider to a jig in a radius chamfering process.

An embodiment of the present invention will be described in detail. In FIGS. 1 through 10, there is shown an example of the magnetic head head device according to the present invention. FIG. 1 is a perspective view of the magnetic head device, and FIGS. 2(a) 2(b) are a side view and a front view of a slider, respectively. FIG. 3 is a perspective exploded view of the slider, and FIGS. 4(a) and 4(b) are schematic views showing how to bond a first holder and a second holder to a head core unit, and how to bond the first holder and a back core to the head core unit, respectively. Neither recording/reproducing coil nor erasing coil is shown for simplification. FIG. 5 is a graph of the characteristic curve showing the relationship between pressing forces and back gaps when bonding is done, and FIGS. 6 through 8 are schematic views showing processes to assemble the first holder, the head core unit, the second holder, the recording/ reproducing coil and the erasing coil. In FIGS. 7 and 8, neither recording/reproducing coil nor erasing coil is shown for simplification. FIGS. 9(a) and 9(b) are schematic views showing how to affix a slider to a jig in grinding and polishing processes for a sliding surface, and FIG. 10 is a schematic view showing a radius chamfering process.

In those Figures, parts of the example which are the same as those of the conventional device are indicated by the same reference numerals as the conventional device, and explanation on those parts will be omitted. In FIGS. 1, 2 and 3, reference numeral 1 designates the magnetic head device which is mounted on e.g. a flexible magnetic disc drive, and which carries out recording, reproducing or erasing. The magnetic head device includes the slider which has the same sizes in a longitudinal direction, a width direction and a height direction as the sizes A, B and C of the conventional slider. Reference numeral 2 designates the recording/ reproducing coil which is inserted into a leg 101g, and which has a coil wire coated with a protective film of a polymido resin film, a polyamide resin film or a polyurethane resin film. Reference numeral 2a designates coil terminals of the recording/reproducing coil 2. Reference numeral 3 designates the erasing coil which is inserted into a leg 101k, and which has a coil wire coated with a protective film of a polymido resin film, a polyamide resin film or polyurethane resin film. Reference numeral 3a designates coil terminals of the erasing coil 3.

Reference numeral 4 designates the first holder which sandwiches a magnetic gap side of the core head unit 101 together with the second holder stated later and is bonded to the core head unit 101 so as to hold the core head unit, and which is substantially in a U-character shape in section. Reference numeral 4a designates a sliding surface which slides with respect to a recording medium (not shown). Reference numeral 4b designates a bottom surface which is in surface contact with a spring member stated later, the area (about 7.8 mm²) of which is substantially not less than 70% of the area of the entire slider (about 11 mm²) which is projected on a plane of the bottom surface from a direction vertical to the bottom surface. The width of the bottom surface (2.05 mm) is substantially not less than 70% of the width direction of the slider. Reference numeral 4c designates a core joint surface which is jointed to the magnetic gap side of the head core unit 101. Reference numeral 4d designates a core joint surface which is jointed to an open end side of the head core unit 101. Reference numeral 4e designates radius chamfered corners which are machined on the sliding surface to prevent the recording medium from being damaged and to enable a recording/reproducing gap 101b and an erasing gap 101d to carry out suitable sliding movement with respect to the recording medium.

Reference numeral 5 designates the second holder which sandwiches the magnetic gap side of the core head unit 101 together with the first holder 4 and is bonded to the core head unit so as to hold the core head unit, and which substantially of a square pillar. Reference numeral 5a designates a sliding surface which carries out sliding movement with respect to the recording medium like the sliding surface 4a. Reference numeral 5b designates a core joint surface which is jointed to the magnetic gap side of the head core unit 101, and which is not clearly shown in FIG. 3. Reference numeral 5c designates radius chamfered corners like the radius chamfered corners 4e. In the description of the embodiment, an assembly which is obtained by assembling the head core unit 101, the recording/reproducing coil 2, the erasing coil 3, the first holder 4, the second holder 5 and the back core 104 is called the slider 6. Reference numeral 7 designates the spring member which holds the slider 6, which is in surface contact with the bottom surface 4b of the holder 4 in a stable manner, and which has the holder 4 bonded and fixed thereto at three edges of the holder like the conventional magnetic head device.

Reference numeral 8 designates an FPC as wiring for data recording. The FPC has one end connected to the coil terminals 2a and the coil terminals 3a by e.g. soldering, and has the other end connected to a device with the magnetic head device 100 FIG. 11 mounted thereto to interchange electric signals.

In FIGS. 4(a) and 4(b) reference Q designates a pressing direction when the first holder 4 and the second holder 5 are bonded to the head core unit 101 at the magnetic gap side. References Q1 and Q2 designate pressing points at this bonding. The locations of the pressing points Q1 and Q2 are preferably determined so that provided the length of the slider 6 is 1, the pressing point Q1 is located within a range of ¼–⅓ from the left edge of the second holder 5 in FIG. 4b, the pressing point Q2 is located within a range of ¼–⅓ from the right edge of the second holder in FIG. 4b, and both pressing points lie symmetrical. The pressing points are located at a middle position on the second holder in the height direction.

Reference P designates a pressing direction when the back core 104 is bonded to the leg 101k, a leg 101i and the leg 101g at the open end side. References P1, P2 and P3 designate pressing points at this bonding. The locations of the pressing points P1, P2 and P3 are substantially located at each central portion where each end of the legs is bonded to the back core 104.

As shown in FIG. 5, the back gaps 105a–105c pf FIG. 4(b) are 2 μm in width when the pressing forces of the respective pressing points P are about 0.13 kg/mm², and the back gaps are 1 μm in width when the pressing forces at the respective pressing points P are about 0.25 kg/mm². The stronger the pressing forces are, the smaller the back gaps 105a–105c get in width.

Now, a method for preparing the slider will be described in detail. In advance, a recording/reproducing core 101f, a center core 101h and an erasing core 101j are bonded together with glass members 101l to constitute the head core unit 101, and the head core unit thus constituted is machined to have a predetermined thickness. In addition, the back core 104 is machined to have a predetermined thickness and predetermined surface accuracy.

Referring now to FIGS. 6 through 8, the production method of the slider 6 will be explained. As shown in FIG. 6, the first holder 4 is set to a holder positioning portion 9a of a jig 9, and the recording/reproducing coil 2 and the erasing coil 3 have sides set to a coil positioning portion 9b. Then, an instantaneous adhesive agent is used to bond bobbins of the recording/reproducing coil 2 and the erasing coil 3 to the first holder 4.

Next, the head core unit 101 is set to have the the leg 101g and the leg 101k inserted into the recording/reproducing coil 2 and the erasing coil 3, respectively.

As shown in FIG. 7, the coil positioning portion 9b is taken off, the first holder 4, the head core unit 101, the recording/reproducing coil 2 and the erasing coil 3 are turned through an angle of 90°, and the sliding surface 4a of the first holder 4 is set to the holder positioning portion 9a.

As shown in FIG. 7, the head core unit 101 has a sliding surface 101a set to the holder positioning portion 9a to be in alignment with the sliding surface 4a of the holder. An adhesive agent is applied on a contact portion of the head core unit 101 where the head core unit is in touch with the second holder 5. The second holder 5 is put on the head core unit 101, and the second holder 5 has the sliding surface 5a set to the holder positioning portion 9a to be in alignment with the sliding surfaces of the first holder and the head core unit.

After the respective sliding surfaces of the first holder 4, the second holder 5 and the head core unit 101 are fitted to the holder positioning portion 9a to be in alignment with one another, pressing forces of 0.25 kg/mm² or more are given to the pressing points Q1 and Q2 as shown in FIGS. 4(a) and 4(b).

Next, the back core 104 is positioned to sandwich the legs 101g, 101i and 101k of the head core unit between the core joint surface 4d and the back core unit 104. An adhesive agent is applied on contact portions of the legs 101g, 101j and 101k where the legs are in touch with the back core 104. Pressing forces of a predetermined value are given to the pressing points P1, P2 and P3 as shown in FIGS. 4(a) and 4(b).

As shown in FIG. 5, the width of the back gaps 105a–105c can be limited to 1 μm or less by giving pressing forces of 0.25 kg/mm² or more to the pressing points P1, P2 and P3 to mount the back core 104 to the legs 101g, 101i and 101k. If it is sufficient for the back gaps to be 2 μm in width in terms of magnetic characteristics, it is enough to give pressing forces of about 0.13 kg/mm².

According to the production method, the pressing forces can be applied to the joint portions between the back core 104 and the legs 101g, 101i and 101k to set the back gaps 105a–105c in a stable and equal manner, improving reliability.

As the adhesive agent, a resin or glass material may be used, in particular, when a resin is used, an epoxy resin is preferable, and strong strength of adhesive bonding can be obtained by heating and solidifying the epoxy resin in a thermostatic chamber while pressing the respective pressing points in the state shown in FIG. 8. When a glass material is used as the adhesive agent, stronger strength of adhesive bonding can be obtained by putting the glass material in gaps created between the first holder 4 and the second holder 5 due to sandwiching the head core unit 101 therebetween, and melt-bonding the glass material in a hot over while pressing the respective pressing points in the state shown in FIG. 8.

The strength of adhesive bonding between the first holder 4 and the coils 2 and 3 can be increased by applying an adhesive agent of such an epoxy resin on bonded portions where the recording/reproducing coil 2 and the erasing coil 3 are bonded to the first holder 4.

In stead of bonding the respective coils and the holder 4 with the epoxy resin adhesive agent to increase the strength of adhesive bonding between the coils and the holder 4, the coils and the second holder 5 may be bonded together with the epoxy adhesive agent.

Now, grinding and polishing processes will be explained. Wax is used to affix a plurality of sliders 6 to a jig 10 as shown in FIG. 9a along the outer periphery of the jig 10 as shown in FIG. 9b. In the embodiment, because the area of the bottom surface 4b occupies substantially not less than 70% of the entire area of the slider which is projected on a plane of bottom surface 4b from a direction vertical to the bottom surface, because the bottom surface occupies substantially not less than 70% of the slider in width, and because an axis of the center of gravity of the slider passes through the bottom surface 4b of the first holder, FIG. 10, it is possible to easily affix the slider 6 to the jig 10, and to properly bond the slider to the jig without positioning the slider on a tilt even if a slight of external force is applied by e.g. handling.

Explanation on processes from the grinding and polishing processes through a radius chamfering process and a washing process subsequent to the process just stated will be omitted because such processes are similar to those for the conventional slider.

After such processes, the spring member 7 is bonded and fixed to the first holder 4 at three edges like the conventional one. Since the bottom surface 4b is wide and the axis of the center of gravity lies at the side of the first holder 4, the slider is stable and can be easily assembled.

And, the wiring 8 is electrically connected to the coil terminals 2a and the coil terminals 3a by e.g. soldering.

Explanation on the operation of the slider will be omitted because the operation is similar to that of conventional one.

Since the magnetic head device shown as the embodiment is constructed as stated above, the following advantages are offered:

Because the back core 104 is not bonded to the holders, and because the back core 104 is not pressed through any holder toward the open end side of the legs, influence due to unevenness in bonding or variations in the pressing forces is hardly created, and it is possible to arrange the back gaps easily and equally.

Since the open ends of the legs are sandwiched between the core joint surface 4d of the first holder 4 and the back core 104, and since the predetermined pressing forces can be applied to the respective legs at substantially central portions of the jointed portions between the legs and the back core 104 to realize easy bonding and fixing, it is possible to arrange the back gaps 105a–105c in an easy and stable manner, and to restrain variations in the magnetic characteristics of individual magnetic head devices, improving reliability.

The first holder 4 is substantially of a U-character shape, the area of the bottom surface 4b of the first holder is substantially not less than 70% of the area of the entire slider 6 which is projected on a plane of the bottom surface from a direction vertical to the bottom surface, the width of the bottom surface is not less than 70% of that of the slider 6, and the slider 6 has the axis of the center of gravity passing through the bottom surface 4b of the holder 4. As a result, it is possible to affix the slider to the jig stably and easily. It is also possible to properly affix the slider to the jig without positioning the slider on a tilt even if an external force is applied by some influence such as handling.

Because the recording/reproducing coil 2 and the erasing coil 3 are bonded and fixed to the first holder 4, it is possible to prevent an undesirable force from being applied to the legs during handling, protecting legs from any external forces to avoid damage to the legs.

Since both coils can be bonded to the first holder 4 to protect the legs by the coils, a shape requirement of the second holder 5 is that the second holder has at least a sliding surface side portion required for smooth sliding movement with respect to the recording medium (not shown) and for edge protection at the side of the sliding surface of the head core unit 101. As a result, the second holders 5 may have a simple shape such as a square pillar, offering an advantage in that the production cost of the second holder 5 can be reduced.

Such structure can be applied to the second holder to omit the process for bonding the second holder 5 and the back core 104 and the grinding and polishing processes for the bonded second holder and back core, improving productivity.

In accordance with the production method of the slider 6 according to the embodiment, the first holder 4 is set to the holder positioning portion of the jig, the recording/reproducing coil 2 and the erasing coil 3 are set to the coil positioning portion, both coils are bonded to the first holder 4, the head core unit 101 is set from above in such a manner that the legs 101g and 101k are respectively inserted into the recording/reproducing coil 2 and the erasing coil 3, those members are turned through an angle of 90° to make the sliding surfaces of the first holder and the head core unit aligned, the adhesive agent is applied to the head core unit, the second holder is positioned to have the sliding surface arranged in alignment with the sliding surfaces of the first holder and head core unit, the predetermined pressing forces are applied to the predetermined pressing points, the back core 104 is set so as to sandwich the open ends of the legs between the core joint surface 4d of the first holder 4 and the back core 104, the adhesive agent is applied, and the predetermined pressing forces are applied to the predetermined pressing points to bond the back core to the legs. As a result, it is possible to easily assemble the slider 6 and to set the back gaps 105a–105c in stable and equal manner.

Although in the embodiment the center core 101h works as not only the recording/reproducing magnetic path but also the erasing magnetic path, the center core 101h may be made from a non-magnetic material to divide into both magnetic paths. Although the single back core 104 is used in the embodiment, the recording/reproducing magnetic circuit and the erasing magnetic circuit may have independent back cores.

The magnetic head device according to the present invention can be used as a floating magnetic head.

We claim:

1. A magnetic head device comprising:
    a magnetic circuit which includes a head core unit, a back core and a coil;
    the head core unit including a first core made from a magnetic material and a second core made from a magnetic material, said first core and said second core each comprising a horizontal portion and a vertical portion, substantially forming an L shape and being positioned with horizontal portions facing each other to form a magnetic gap between the first core and the second core;
    the back core being made from a magnetic material and joined to the vertical portion of each of the first core and the second core with back gaps formed between the back core and the vertical portions of the first core and second core;
    the coil arranged around the vertical portion of the first core;
    a first holder which is bonded to the horizontal portions of each of the first core and the second core at two locations, one on a side of the magnetic gap and one on a side of the back gaps so as to hold the magnetic circuit; and
    a second holder which is bonded to the first core and the second core at the magnetic gap side so as to hold the magnetic circuit, and which is substantially a rectangular beam.

2. The magnetic head device according to claim 1, wherein said coil is adapted for recording on a magnetic circuit,
    said magnetic head device further comprising a second coil for erasing said magnetic tape, said second coil being arranged on said second core.

3. The magnetic head device according to claim 2, wherein the coil and the second coil are each comprised of coil wires coated with a film made from one of polymido resin, polyamide resin and polyurethane resin.

4. The magnetic head device according to claim 2, further comprising a supporting member for holding the first holder;
    wherein the first holder includes a contact surface which has a predetermined area of contact to the supporting member, and the magnetic device has an axis of the center of gravity passing through the contact surface.

5. The magnetic head device according to claim 4, wherein the area of the contact surface is larger than 50% of the area of the magnetic head device except for the supporting member, which is projected on a plane of the contact surface from a direction vertical to the contact surface.

6. The magnetic head device according to claim 5, wherein the coil and the second coil are bonded to the first holder.

7. The magnetic head device according to claim 2, wherein said coil and said second coil are bonded to the first holder.

8. The magnetic head device according to claim 2, said head core further comprising a third core comprising a vertical portion extending from a point between ends of the horizontal portions of the first and second cores, the vertical portions of said first, second and third cores being parallel to each other.

9. The magnetic head device according to claim 8, wherein the third core divides the magnetic circuit into a first path through said first core to form a recording/reproducing magnetic circuit and a second path through said second core to form an erasing magnetic circuit.

10. The magnetic head device according to claim 9, wherein the coil and the second coil have coil wires coated with a film made from polymido resin, polyamide resin or polyurethane resin.

11. A magnetic head device comprising:
    a magnetic circuit which includes a head core unit, a recording/reproducing coil, an erasing coil, and a back core;
    the head core including a first core made from a magnetic material, a second core forming a first magnetic gap between the first core and the second core so as to carry out magnetic recording or reproducing of a magnetic tape, and a third core made from a magnetic material and forming a second magnetic gap between the second core and third core so as to carry out magnetic erasing of a magnetic tape;
    said first core and third core each comprising a horizontal portion and a vertical portion, each core substantially forming an L shape, said second core comprising a vertical portion extending from a connection point between ends of the horizontal portions of the first and third cores, the vertical portions of said first, second and third cores being parallel to each other;

the recording/reproducing coil arranged around the vertical portion of first core so as to carry out electromagnetic conversion;

the erasing coil arranged around the vertical portion of the third core so as to carry out electromagnetic conversion;

the back core being made from a magnetic material and joined to the vertical portion of each of the first core, the second core and the third core with back gaps formed between the back core and the vertical portions of the first core, the second core and the third core;

a first holder which is bonded to the head core unit in two discrete locations, one being at the horizontal portions of the first core and the third core and to the second core at the common connection point of the first and third cores and the other being at the vertical portions of each of the first, second and third cores;

a second holder which is bonded to the horizontal portions of the first core, and the third core and to the second core at the common connection point of the first and third cores opposite said first holder so as to hold the magnetic circuit, and which is substantially a rectangular beam; and a supporting member for holding the first holder, said vertical portions of said first, second and third cores being substantially perpendicular to said supporting member.

12. The magnetic head device according to claim 11, wherein the recording/reproducing coil and the erasing coil are bonded to the first holder.

13. The magnetic head device according to claim 11, wherein the first holder includes a contact surface which has predetermined area of contact to the supporting member, and the magnetic head device has an axis of the center of gravity passing through the contact surface.

14. The magnetic head device according to claim 13, wherein the area of the contact surface is larger than 50% of the area of the magnetic head device except for the supporting member, which is projected on a plane of the contact surface from a direction vertical to the contact surface.

15. The magnetic head device according to claim 13, wherein the recording/reproducing coil and erasing coil are bonded to the first holder.

16. The magnetic head device according to claim 11, wherein the second core divides the magnetic circuit into a first path through said first core for a recording/reproducing magnetic circuit and a second path through said third core for an erasing magnetic circuit.

17. The magnetic head device according to claim 11, wherein, the recording/reproducing coil and the erasing coil have coil wires coated with a film made from polymido resin, polyamide resin or polyurethane resin.

* * * * *